United States Patent Office 2,782,174
Patented Feb. 19, 1957

2,782,174
DISPERSIONS OF PERFLUOROCARBON POLYMERS

Alexander C. Hetherington, Mountainside, and Wilber O. Teeters, River Edge, N. J., assignors to The M. W. Kellogg Company, New York, N. Y., a corporation of Delaware No Drawing. Application October 8, 1952,
Serial No. 313,792

15 Claims. (Cl. 260—29.6)

This invention relates to dispersions of high molecular weight polymers of perfluorochlorocarbons, to a method of preparing them and to a product which is useful in said preparation. In one aspect, this invention relates to dispersions or suspensions of solid polymers of the single monomer trifluorochloroethylene.

Polymers of trifluorochloroethylene possess certain physical and chemical characteristics which make the polymers particularly desirable as surface coatings and impregnants. The normally solid polymer produced from the single monomer trifluorochloroethylene is hard but not brittle and is flowable under pressure at temperatures above 225° C. The polymers of trifluorochloroethylene in general possess excellent mechanical properties, resistance to chemicals and oxidation, flame resistance, superior electrical properties and high working temperatures. Four-fifths of the weight of the polymer of this single monomer is made of the two halogens, fluorine and chlorine. The quick quenched normally solid polymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The normally solid polymer is flexible and resilient, has a high impact strength at low temperatures and is resistant to thermal shock. The polymer is not wetted by water and is unaffected by high humidity. Table I below shows some of the electrical characteristics of the normally solid polymer under high frequency:

TABLE I

Solid polymer of trifluorochloroethylene

| Electrical Frequency, cycles/sec. | Dielectric Constant E | Dielectric Power Loss, Tan |
|---|---|---|
| $1 \times 10^2$ | 2.72 | $0.022 \pm 0.0011$ |
| $1 \times 10^3$ | 2.63 | $0.27 \pm 0.0014$ |
| $1 \times 10^4$ | 2.53 | $0.023 \pm 0.0012$ |
| $1 \times 10^5$ | 2.46 | $0.0135 \pm 0.0008$ |
| $1 \times 10^6$ | 2.43 | $0.0082 \pm 0.0004$ |
| $1 \times 10^7$ | 2.35 | $0.0060 \pm 0.0003$ |
| $1 \times 10^8$ | 2.30 | $0.0028 \pm 0.0002$ |
| $3 \times 10^8$ | 2.30 | 0.0030 |
| $3 \times 10^9$ | 2.30 | $0.0028 \pm 0.0002$ |
| $1 \times 10^{10}$ | 2.29 | $0.0039 \pm 0.0002$ |
| $2.5 \times 10^{10}$ | 2.29 | 0.0055 |

Other physical properties of the normally solid polymer are shown below in Table II:

TABLE II

| Property | Test Result |
|---|---|
| Specific gravity | 2.1. |
| Tensile strength at 86° F., p. s. i. | 9,400. |
| Elongation at break 86° F., percent | 127. |
| Coefficient of linear expansion (−320° F. to 167° F.) | $3.5 \times 10^{-5}$. |
| Specific resistance, ohms | $5 \times 10^{17}$. |
| Water absorption, percent | 0.00. |
| Outdoor weathering | no detectable change. |

Normally solid polymers produced from the single monomer trifluorochloroethylene may be prepared by polymerizing the monomer in the presence of a suitable organic peroxide such as bistrichloroacetyl peroxide, as the polymerizing agent, at a temperature between about −20° and about 25° C., preferably at a temperature of about −16° C. At a temperature of −16° C. the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary. A discussion of the method of preparing the high molecular weight polymer of trifluorochloroethylene may be found in the patent to William T. Miller, Serial No. 2,579,437, issued December 18, 1951.

To distinguish the normally solid polymer over the oils and waxes produced with the same monomer, the polymer is described by reference to its no strength temperature. A no strength temperature (N. S. T.) of between about 200° and about 350° C. is characteristic of a normally solid polymer of the above preparation having plastic characteristics. Best plastic characteristics of the normally solid polymer are observed at N. S. T. values between about 240 and about 340. The N. S. T. values of the polymer depend upon such factors as temperature, residence time, concentration of promoter, pressure, etc. Since this invention does not relate to the method of producing the polymer of particular characteristics, further discussion thereof will not be undertaken.

The no strength temperature (N. S. T.) is determined in the following manner: A sample of polytrifluorochloroethylene is hot pressed into a $\frac{1}{16}''$ thick sheet and cut into a strip of $\frac{1}{8}'' \times \frac{1}{16}'' \times 1\frac{5}{8}''$. The strip is notched $\frac{5}{8}''$ from the top so that the dimension at the notch shall be $\frac{1}{16}'' \times \frac{1}{16}''$. A fine wire and a standard weight is attached to one end of the strip. The weight of the polymer plus the wire and standard weight shall equal ½ gram. The strip is then attached in a furnace and fixed vertically therein. The temperature of the sample is increased at a rate of about 1½° C. per minute in the furnace as the breaking temperature is approached. The no strength temperature is the breaking temperature of the sample. Differences of about 5° C. are considered significant.

As a result of the excellent chemical and physical properties of the polymers of trifluorochloroethylene, the polymers have use as coatings on various surfaces in order to make such surfaces corrosion resistant to chemicals. The good electrical, non-wetting and flame resistant properties of the polymer also makes its use feasible as insulating coatings on electrical conductors, condensers and various parts used in electrical apparatus and circuits. The polymer may be applied to various surfaces, including flat and curved surfaces, wires, fabrics, yarn, paper, leather, cables, cans, glass, wood, etc. The polymer may be applied to metal wires, particularly aluminum, iron and copper, to act as an insulator on the surface of the wires. The coating of fabrics with polytrifluorochloroethylene plastic renders the fabrics fire proof and shrink resistant and increases the strength of the fabrics. Initially, the normally solid polymer was applied to the surface by melting the polymer and applying it to the surface, such as by extrusion, or by dissolving the solid polymer in a suitable solvent, coating the surface with the solution and subsequently evaporating the solvent. It was later found to be advantageous to prepare the polymer in a dispersed form in a non-aqueous or in an aqueous dispersion medium.

Application Serial No. 135,847, filed by Wilber O. Teeters on December 29, 1949 on "Dispersion of Trifluorochlorocarbon Polymers" discusses the preparation of dispersions of the polymer of trifluorochloroethylene in non-aqueous dispersing liquids, such as ketones and esters. Application Serial No. 135,823 filed by Charles D. Dipner on December 29, 1949 on "Dispersion of Fluorocarbon Polymers" discusses the preparation of dispersions of the same polymer in glycol dispersing media. Application Serial No. 202,408 filed by Wilber O. Teeters and Charles D. Dipner on December 22, 1950 on "Aqueous Dispersion of Fluorocarbon Polymers" discusses the preparation of dispersions of the polymer of trifluorochloroethylene in a liquid dispersing medium comprising water and a water soluble oxy-compound. Application No. 282,306 filed by Erving Green and Charles D. Dipner on April 15, 1952, on "Dispersions of Plastic Polytrifluorochloroethylene and Preparation Thereof" discusses the preparation of dispersions of the polymer of trifluorochloroethylene in liquid dispersing media by methods which result in the minimum degradation of the N. S. T. value of the polymer. In all of the aforementioned applications the dispersions are prepared by wet milling the plastic polymer in the liquid dispersing medium until a uniform dispersion is obtained.

These applications discuss the advantages of trifluorochloroethylene dispersions in making films and coating over the prior art methods involving molten polymer or polymer solutions. In the most recent method of preparation, according to the application of Green and Dipner, Serial No. 282,306 the dispersions are prepared by dry milling the polymer in the absence of a dispersing medium until at least 45% by weight passes through a standard 325 mesh screen, adding the dispersing medium and then wet milling the mixture for a period of three to ten hours.

It has now been found that satisfactory dispersions may be prepared from solids recovered from the aforementioned dispersions after removal of the bulk of the dispersing medium.

It has been found for example that the solids recovered from the spray drying of a dispersion prepared in the usual manner may be redispersed in a similar dispersing medium or in a different dispersing medium with only mild stirring. In view of the fact that, as disclosed in the Green and Dipner application, Serial No. 282,306, the finely divided polymer of prolonged dry milling cannot be blended with a dispersing medium to produce a good dispersion without at least three hours of wet milling, it is surprising that the finely divided solid polymer recovered from a dispersion can be redispersed so readily without any wet milling. Dispersions prepared by adding a new dispersing medium to solids recovered from a previous dispersion show the flow characteristics and particle distribution of good dispersions. A glass stirring rod or test tube dipped into a freshly prepared dispersion and withdrawn will not show "rivering," or uneven flow over the glass surface.

It is an object of this invention to produce a salable powder of the plastic polymer of trifluorochloroethylene which may be dispersed in a thinner with mild stirring.

Another object of this invention is to produce a powdered plastic polymer of trifluorochloroethylene which may be dispersed with facility in any dispersing medium selected by the user.

Another object of this invention is to produce a high N. S. T. trifluorochloroethylene polymer powder in dispersible form, permitting easy storage and easy shipping by eliminating the dispersing medium, which is between 60 and 80 weight percent of the dispersion.

The dispersions prepared in accordance with the methods disclosed in the patent applications discussed above are smooth and comparatively uniform. There is some tendency for the polymer powder to settle out and leave a relatively clear supernatant liquid. Even after partial concentration by pouring off the supernatant liquid there is still some tendency for the polymer powder to settle. However, slight stirring immediately prior to use brings the dispersion back to uniform consistency. The bulk of the polymer powder particles range in size from 0.1 to 3 microns in diameter.

The dispersion produced by redispersing polymer powder recovered from a prior dispersion has characteristics substantially identical with those of the prior dispersion. It has been noted, however, that freshly prepared dispersions from redispersed polymer powder require 5 to 10 percent more polymer for dispersions of the same viscosity. These dispersions thicken as absorption occurs and after several hours resemble initial dispersions with respect to the concentration of solids. This characteristic of freshly prepared redispersed polymer gives an additional unexpected advantage in that a great percentage of solids in a dispersion of workable viscosity permits the laying down of thicker coatings of polymer from a single application of dispersion. Conversely, it permits the laying down of coating of desired thickness in fewer applications.

Plastic film coatings are prepared from the redispersed polymer in the same manner as from the original dispersions. The dispersions may be applied to a surface to be covered by a film by any method, such as the dipping, spraying or painting. The wet film is permitted to dry and the deposited solid is then heated to a temperature of 220° C., or higher, for from 30 seconds to 25 minutes to cause fusion and sintering of the solid powder particles of polymer. Shorter periods of time within the above range are permissible with higher temperatures of fusion. The lower temperatures of fusion are preferred since the tendency of the polymer to decompose and attack metal surfaces is minimized. If insufficient film thickness is obtained after a single application followed by fusion, the entire procedure may be repeated until the desired film thickness is obtained. On rigid metal surfaces, it may be desirable to lower the temperature following fusion at a slow rate, giving better adhesion. On the other hand, when flexibility and toughness are required, a quick quench of the fused film will be necessary to obtain an essentially amorphous polymer.

The dispersing media employed for the purpose of this invention may include any non-solvent normally liquid medium generally used in the preparation of dispersions of halogenated polymers or copolymers. They may include single compounds or mixtures or compounds and may include the non-aqueous compounds disclosed in the application of Teeters, Serial No. 135,847, and those disclosed in the application of Dipner, Serial No. 135,823. Such compounds include esters (ethyl acetate, butyl acetate, etc.), carbonyl compounds (acetone, methyl ethyl ketone, etc.), ethers, (monoethyl ether of ethylene glycol, etc.), aromatic hydrocarbons (benzene, toluene, xylene, etc.) and/or other lacquer solvents. This invention also contemplates the use of aqueous dispersion media, comprising mixtures of water and water soluble oxy-compounds, as disclosed in the application of Teeters and Dipner, Serial No. 202,408. Such water soluble oxy-compounds include monohydric alcohols (ethanol, butanol, pentanol, etc.), polyfunctional alcohols (methoxy ethanol, butoxy ethanol, etc.), ketones (acetone, methyl ethyl ketone, diethyl ketone, etc.) and substituted polyethylene oxides.

The amount of dispersing liquid removed may vary as desired, in general, greater benefits in economy resulting from the removal of a greater proportion of the dispersing liquid. In order to obtain the best effects enough of the dispersing liquid should be removed so that the residue contains at least 80 percent total solids by weight. It is obvious that even greater benefits may be obtained by reducing the dispersing liquid concentration so that a residue of 95 percent or more of solids remains. Whenever a relatively large amount of the dispersing liquid is permitted to remain, the redispersing liquid should be identical or miscible with it.

The bulk of the dispersing liquid may be removed by the utilization of any of the physical differences between the dispersing liquid and the dispersed solids. The best methods of removing dispersing liquid involve either filtration or spray drying. Other methods may be used, however, such as centrifugal separation.

Any filtration equipment may be used in the filtration step, and specifically, filtration may be by gravity, by suction, or by pressure. If desired, a continuous filter of the rotating drum type may be used. In any case, the filtration step will produce a wet press cake containing 90 percent or better of solids. This product may be stored and shipped as such since it is readily redisperable. If desired, it may be further dried.

In drying the wet press cake excessive temperatures must be avoided. It has not been found possible to dry a wet press cake at an elevated temperature and then get it to redisperse in a dispersing liquid with any ease. It appears that during the drying operation at elevated temperatures, reagglomeration occurs. It has been found that air-drying at ambient temperatures produces a satisfactory powder containing better than 95 percent solids content. Moderately elevated temperatures may be used, but in no case should they exceed 180° C. If desired, drying at low temperatures may be facilitated by washing away the remaining dispersing medium with a highly volatile washing liquid, such as acetone, which permits easy drying of the solid polymer at low temperatures.

In spray drying ordinary commercial equipment may be used. Elevated drying temperatures may be used without danger of agglomeration. The liquid dispersion is fed in at the top and finely atomized as it passes countercurrent to a hot stream of air or other drying gas. The dried particles together with drying gas and vaporized dispersion liquid are then withdrawn and the particles are separated and recovered. When a combustible dispersing liquid is used, care must be taken to avoid combustible mixtures in the dryer. This may be done either by adjustment of feed rates or by the use of a non-oxidizing drying gas.

Specific methods of the operation of this invention are illustrated in the examples below:

*Example I.*—100 pounds of a polytrifluorochloroethylene dispersion containing 20 percent by weight of high N. S. T. plastic total solids and 80 percent of a dispersing liquid (xylene—85 percent, diisobutyl ketone—15 percent) was filtered with suction through a glass sintered filter. The pressed cake weighed 21 pounds and contained 95 percent solids, the remainder being the hydrocarbon-ketone dispersing liquid as a filtrate.

*Example II.*—10 pounds of the pressed cake obtained in Example I was spread out in a drying tray and permitted to air-dry for twenty-four hours. The weight of the air-dried powder was 96 pounds and contained 99 percent solids. The powders obtained in Examples I and II redispersed readily with mild stirring when added in 5 pound quantities to 20 pounds of hydrocarbon-ketone dispersing liquid. These new dispersions gave good coverage on metal and glass surfaces by spray or dip application.

*Example III.*—The laboratory spray drier used in this test consisted of a stainless steel cylinder through which combustion gases could be passed at any desired temperature level. The liquid to be dried was fed to the top of the cylinder through an injector rotating at about 50,000 R. P. M. It was, of course, finally atomized and dried as it descended a spiral path through the cylinder. The dried particles, combustion gases, and vaporized thinner were then withdrawn through a duct to tangentially enter a cyclone separator. Tests were run on two different dispersions, designated as NI, containing 20 percent of plastic polytrifluorochloroethylene and 80 percent thinner, and NW-25, containing 20 percent of plastic polytrifluorochloroethylene, 7 percent of polytrifluorochloroethylene wax as plasticizer and 73 percent thinner. The thinner was a composition of 85 percent xylene and 15 percent diisobutyl ketone. In each run the feed rate was maintained for a period of approximately one minute. There was considerable variation in recovery in the individual runs, largely due to losses by adhesion of particles to the 15 to 20 square feet of surface in the apparatus. There was a tendency, however, for this powder loss to be equalized over a plurality of runs, and it was felt that the average percentage recovery over a plurality of runs represented more meaningful data than the percentage recovery on any individual run.

The following table gives pertinent test data:

|  | Test No. | | | | |
|---|---|---|---|---|---|
|  | 1 | 2 | 3 | 4 | 5 |
| Material | NI | NI | NI | NW-25 | NW-25 |
| S. G. | 0.977 | 0.977 | 0.977 | 0.988 | 0.988 |
| Percent Solids | 17.3 | 17.3 | 17.3 | 21.5 | 21.5 |
| Feed: | | | | | |
| Feed Temp., ° F | 60 | 60 | 60 | 60 | 60 |
| Feed Rate, Ml./min. | 980 | 620 | 1,420 | 990 | 1,000 |
| Air Temperature: | | | | | |
| Inlet | 175 | (est.) 70 | 140 | 246 | 370 |
| Upper Wall | 113 | 60 | 82 | 145 | 225 |
| Lower Wall | 110 | 56 | 80 | 145 | 220 |
| Outlet | 110 | 60 | 80 | 135 | 205 |
| Cold Air Port | Closed | Closed | Closed | Closed | Closed |
| Sweeper Duct | Closed | Closed | Closed | Closed | Closed |
| Total Product | 94 | 121 | 217 | 152 | 261 |
| Percent Recovery | | 82.7 | | 98 | |

It was noted that the overall recovery for both materials was approximately 90 percent. It appeared that the plasticized material was more easily recovered than the unplasticized. All recovered samples were better than 98 percent dry.

Samples of dried powder from each run were redispersed with the same thinner to good dipping consistency. It was observed, as stated above, that these dispersions, when first prepared, hold 5 to 10 percent more polymer than original dispersions of the same viscosity.

The dispersions prepared in accordance with this invention by redispersing solids recovered from prior dispersions produce plastic coatings possessing the same good mechanical and electrical properties and good chemical resistance as coatings produced from other dispersions. These coatings may be used for any purpose for which previous polytrifluorochloroethylene plastic coatings have been proposed.

Paper, fabric and ceramic sheets coated with trifluorochloroethylene polymers are used as jackets for the insulation of wire and cable. The fabrics or papers are applied in the form of tapes, sheets or braids. A final polytrifluorochloroethylene coat may be placed over the wrapped wire, if desirable.

The dispersions may be used as saturants for the treatment of asbestos and glass yarns and fabrics (plus fusion treatment) employed on a number of small power cables, switchboard and stove wires.

Protection of metal against the various service conditions to which it may be exposed is solved in numerous cases by coating the exposed surface with polytrifluorochloroethylene applied from dispersion. For example, steel valves intended to be used in highly corrosive acid solutions at 80° to 90° C. may be protected by passing a plastic dispersion over the surface to be protected, draining, air drying and fusing for 20 minutes at 250° C. Similarly, the inside of an aluminum tank intended to withstand nitric acid and its vapors at temperatures up to 80° C. may be protected by partially filling it with the polytrifluorochloroethylene plastic dispersion, rotating to wet the internal surface, draining, drying and fusing to form a continuous non-porous film.

If desired, plasticizers may also be included in the redispersed powder of this invention just as disclosed with respect to prior non-aqueous dispersions in the application of Dipner and Teeters, Serial No. 136,168, filed December 30, 1949, and with respect to prior aqueous dispersions in the application of Green, Serial No. 202,435, filed December 22, 1950. The preferred plasticizers are the normally liquid and waxy polymers of trifluorochloroethylene, although any of the plasticizers named in the earlier applications may be used. In most non-aqueous dispersing liquids the plasticizer is soluble. It may be added to the dispersing liquid either before or after the addition of the redispersable plastic polymer. With aqueous dispersions the plasticizer is preferably prepared as a separate dispersion and then blended with the plastic dispersion. The presence of a plasticizer in the dispersion makes possible the use of lower fusion temperatures in the preparation of plastic films. Temperatures as low as 200° C. may be used to fuse a dried solid residue in the formation of a film depending on the amount of plasticizer used. Maintenance of elevated temperatures for long periods results in gradual change of composition by volatilization of the plasticizer.

Fillers may also be incorporated in the redispersion. They may be added with gentle stirring after redispersing the polymer, or they may be included with the polymer and dispersed at the same time. Examples of stable fillers are calcium silicate, calcium carbonate, carbon black, titanium dioxide, etc., with particle dimensions of approximately 0.5 micron in diameter. Inorganic pigments or organic pigments such as the phthalocyanines and chrome green can also be incorporated in the polytrifluorochloroethylene dispersions. Inorganic pigments are preferred.

The present invention includes within its scope copolymers of trifluorochloroethylene with minor amounts of other monomers, such as vinyl chlorides, vinylidene fluoride, tetrafluoroethylene, perfluoropropene, perfluorobutadiene and acrylonitriles. It is to be understood that the terms "polymer of trifluorochloroethylene," and "polytrifluorochloroethylene," as used herein include both the homopolymer and such copolymers as have comparable physical properties. With the exception of trifluoroethylene and tetrafluoroethylene, the use of these other monomers is limited to less than about 20% by weight of the polymer, preferably less than about 5%, since greater amounts result in substantial alteration of the physical characteristics of the polymer. In some cases, the use of greater amounts of other monomers results in changed solubility characteristics so that the polymer becomes soluble in some polar organic dispersing media. With trifluoroethylene and tetrafluoroethylene, greater amounts up to 50% by weight may be incorporated as copolymer.

We claim:

1. A composition comprising finely divided solid particles of plastic polytrifluorochloroethylene and not more than 20% by weight of a substantially non-solvent, normally liquid dispersing medium, said composition being readily dispersible by stirring alone in a substantially non-solvent, normally liquid dispersing medium to produce a stable dispersion and having been prepared by a process comprising the removal of the greater portion of said liquid dispersing medium from a dispersion prepared by milling said plastic polytrifluorochloroethylene in said liquid dispersing medium.

2. A composition containing at least 80% of solids, comprising finely divided solid particles of plastic polytrifluorochloroethylene, the bulk of which range in diameter from 0.1 to 3 microns, said composition being readily dispersible by stirring alone in a substantially non-solvent, normally liquid dispersing medium to produce a stable dispersion and having been prepared by a process comprising the removal of the greater portion of said liquid dispersing medium from a dispersion prepared by milling said plastic polytrifluorochloroethylene in said liquid dispersing medium.

3. A compostion comprising finely divided solid particles of plastic polytrifluorochloroethylene and not more than 5% by weight of a substantially non-solvent, normally liquid dispersing medium, said composition being readily dispersible by stirring alone in a substantially non-solvent, normally liquid dispersing medium to produce a stable dispersion and having been prepared by a process comprising the removal of the greater portion of said liquid dispersing medium from a dispersion prepared by milling said plastic polytrifluorochloroethylene in said liquid dispersing medum.

4. A composition containing at least 95% of solids, comprising finely divided solid particles of plastic polytrifluorochloroethylene, the bulk of which range in diameter from 0.1 to 3 microns, said composition being readily dispersible by stirring alone in a substantially non-solvent, normally liquid dispersing medium to produce a stable dispersion and having been prepared by a process comprising the removal of the greater portion of said liquid dispersing medium from a dispersion prepared by milling said plastic polytrifluorochloroethylene in said liquid dispersing medium.

5. A filter press cake contaning at least 90% of solids and comprising finely divided solid particles of plastic polytrifluorochloroethylene, said cake being readily dispersible by stirring alone in a substantially non-solvent, normally liquid dispersing medium to produce a stable dispersion and having been prepared by a process comprising the removal by filtration of the greater portion of said liquid dispersing medium from a dispersion prepared by milling said plastic polytrifluorochloroethylene in said liquid dispersing medium.

6. A wet filter press cake containing at least 90% of solids and comprising finely divided solid particles of plastic polytrifluorochloroethylene, said cake being readily dispersible by stirring alone in a substantially non-solvent, normally liquid dispersing medium to produce a stable dispersion and having been prepared by a process comprising the removal by filtration of the greater portion of said liquid dispersing medium from a dispersion prepared by milling said plastic polytrifluorochloroethylene in said liquid dispersing medium.

7. A dry filter press cake containing at least 95% of solids and comprising finely divided solid particles of plastic polytrifluorochloroethylene, said cake being readily dispersible by stirring alone in a substantially non-solvent, normally liquid dispersing medium to produce a stable dispersion and having been prepared by a process comprising the removal by filtration of the greater portion of said liquid dispersing medium from a dispersion prepared by milling said plastic polytrifluorochloroethylene in said liquid dispersing medium.

8. A spray-dried product containing at least 95% of solids and comprising finely divided solid particles of plastic polytrifluorochloroethylene, said product being readily dispersible by stirring alone in a substantially non-solvent, normally liquid dispersing medium to produce a stable dispersion and having been prepared by a process comprising the removal by spray drying of the greater portion of said liquid dispersing medium from a dispersion prepared by milling said plastic polytrifluorochloroethylene in said liquid dispersing medium.

9. A method of preparing a readily dispersible composition comprising finely divided solid particles of plastic polytrifluorochloroethylene which comprise wet-milling a mixture of feed-plastic polytrifluorochloroethylene and a substantially non-solvent normally liquid dispersing medium until a uniform dispersion is obtained, then removing a sufficient amount of the dispersing medium so that the resulting composition contains at least 80% of solids.

10. A method of preparing a readily dispersible composition comprising finely divided solid particles of plastic polytrifluorochloroethylene which comprise wet-milling a mixture of feed-plastic polytrifluorochloroethylene and a substantially non-solvent normally liquid dispersing medium until a uniform dispersion is obtained, and filtering said dispersion to produce a filter press cake containing at least 90% of solids.

11. A method of preparing a readily dispersible composition comprising finely divided solid particles of plastic polytrifluorochloroethylene which comprise wet-milling a mixture of feed-plastic polytrifluorochloroethylene and a substantially non-solvent normally liquid dispersing medium until a uniform dispersion is obtained, atomizing said dispersion to produce tiny droplets thereof and passing said droplets countercurrent to a hot drying gas to remove a major portion of said dispersing medium and to produce a product containing at least 95% by weight of solids.

12. A method of preparing a readily dispersible composition comprising finely divided solid particles of plastic polytrifluorochloroethylene which comprise wet-milling a mixture of feed-plastic polytrifluorochloroethylene and a substantially non-solvent normally liquid dispersing medium until a uniform dispersion is obtained, filtering said dispersion to produce a filter press cake and drying said filter press cake at a temperature not exceeding 180° C. to produce a final product containing at least 95 percent of solids.

13. The composition of claim 1 wherein said first-named substantially non-solvent, normally liquid dispersing medium comprises a mixture of water and at least one water soluble oxy-compound.

14. The composition of claim 1 wherein said first-named substantially non-solvent, normally liquid dispersing medium comprises a mixture of an aromatic hydrocarbon and a ketone.

15. The composition of claim 1 wherein said first-named substantially non-solvent, normally liquid dispersing medium comprises a mixture of xylene and diisobutyl ketone.

References Cited in the file of this patent
UNITED STATES PATENTS

| | | |
|---|---|---|
| 2,478,229 | Berry | Aug. 9, 1949 |
| 2,484,483 | Berry | Oct. 11, 1949 |
| 2,531,134 | Kropa et al. | Nov. 21, 1950 |
| 2,559,752 | Berry | July 10, 1951 |
| 2,581,454 | Sprung | Jan. 8, 1952 |
| 2,689,241 | Dittman et al. | Sept. 4, 1954 |
| 2,694,701 | Blum et al. | Nov. 16, 1954 |